3,275,581
COPOLYMERIZATES INCLUDING METHYL GLUCOSIDE ALLYL ETHERS AND PROCESS OF PREPARING SAME
Richard G. Schweiger, San Diego, Calif., assignor to Kelco Company, San Diego, Calif., a corporation of Delaware
No Drawing. Filed Aug. 27, 1963, Ser. No. 304,957
26 Claims. (Cl. 260—17.4)

This invention relates to novel two-numbered copolymers of certain allyl ethers of methyl glucoside and acrylamide; and to processes of preparing these.

Despite the large number of natural and synthetic polymers which are either film-forming or which are dispersible in water to give solutions of anomalous viscosity, or indeed both, most of the known and available polymers of this class leave much to be desired. Solubility in various solvents, particularly those adapted for casting films; the durability of the films produced; the viscosity and gelling characteristics of the water dispersible polymers, and of great importance, the resistance of solutions of the latter to microbiological degradation, can all be improved on.

An object of the present invention is to provide a novel and useful copolymer of certain allyl ethers of methyl glucoside together with acrylamide.

Another object is to provide such copolymers in a water dispersible form, exhibiting good resistance to decay.

Other objects of the invention will become apparent as the description thereof proceeds.

Generally speaking and in accordance with an illustrative embodiment of my invention, I make a copolymer of each of two monomers, in which the respective proportion of the two in the final copolymer may vary over the range of about 10 to 1 to 1 to 10. One of the two monomers which I employ is acrylamide. This is a well known and widely available chemical compound, having the formula $CH_2=CHCONH_2$. It is a crystalline solid having a molecular weight of 71 and a melting point of about 84.5° C. It has good thermal stability by itself, and offers little difficulty in storage and handling.

The second monomer which enters into the copolymer is an allyl ether of methyl α-D-glucoside having a D.S. of 1.0 or 2.0. That is, it is the monoallyl ether or the diallyl ether. It may also be a mixture of the said two monomers in any proportion. These allyl ethers are conveniently made by allylating methyl α-D-glucoside. The latter is a polyhydric alcohol having a heterocyclic ring structure, and has the following chemical formula:

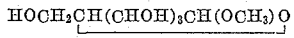

Methyl glucoside, as the above is commonly termed, has a molecular weight of 194, a melting point of 166–168° C., and is soluble to the extent of about 5% by weight in methanol and 180% by weight in water, at room temperature. It is commercially available in the United States in large quantity and high purity.

I make the allyl ethers of methyl α-D-glucoside having a D.S. of 1.0 or 2.0 by treating methyl α-D-glucoside in aqueous alkaline solution with an allyl halide such as allyl chloride or allyl bromide and including in the reaction mixture a second water immiscible phase of a solvent in which the diallyl ether is soluble such as toluene, benzene, xylene, liquid chlorinated hydrocarbons based on methane and ethane, and the like. Detailed directions for preparing these allyl ethers will be found in my co-pending application entitled "Glucoside Derivatives and Process of Making Same," Serial No. 304,972, filed August 27, 1963, and now abandoned.

As is common in copolymerizations, the copolymer, initially formed from a batch containing two different monomers in a given ratio, will not in general exhibit the same ratio of monomers in the copolymer. However, if the initial amount of one monomer is increased the amount of said monomer in the polymer will also be increased. In accordance with known techniques, this will of course be taken into account by those desiring to practice this invention. Some examples showing typical ratios obtained will be given hereinbelow.

The copolymerization may be carried out using known techniques. The general method is to dissolve the two starting monomers in a suitable solvent such as methanol or water, add a catalyst, and maintain the mixture at a suitable temperature for a long enough period of time for the desired copolymerization to take place. Peroxide catalysts are most generally useful, such as ammonium persulfate, methyl ethyl ketone peroxide, benzoyl peroxide, and the like. In general, the higher the temperature, the shorter the time needed for copolymerization to be completed. The temperature may range from 45 to 70° C. and the time for carrying out the reaction may range from 20 to 60 hrs. A representative temperature is 55° C. with a representative time of 48 hrs.

In order to increase the percentage of carbohydrate residues in the polymers I have found it advantageous to keep the concentration of acrylamide at a minimum while carrying out the polymerization reaction. Thus, for example, I may add a solution of acrylamide to the polymerizing mixture (allyl ether, catalyst and solvent) dropwise over an extended period of time. Still another method of increasing the percentage of carbohydrates in the polymers which I may use either alone or in combination with the aforementioned method is using oxygen, per se, as the catalyst.

Some examples will now be given of the procedure in accordance with my invention:

*Example I*

Varying portions (0.5 to 1.0 g.) of the monoallyl ether of methyl α-D-glucoside and acrylamide and, in another series, diallyl ether of methyl α-D-glucoside and acrylamide were dissolved in about 5 ml. of methanol, a few drops of methyl ethyl ketone peroxide (60% in dimethyl phthalate) were added, and the mixture was kept at 50–55° for 48 hr. The precipitate was filtered off, washed with methanol, dried, and analyzed for nitrogen. Results including the amount of sugar in the polymers calculated from the nitrogen analysis are given in the following table:

| Monoallyl | Acrylamide [a] | N, percent | Sugar, percent |
|---|---|---|---|
| 2 | 1 | 11.06 | 42 |
| 1 | 1 | 13.30 | 30 |
| 1 | 2 | 14.56 | 23 |
| 2 [b] | 1 | 12.88 | 32 |

| Diallyl | Acrylamide | N, percent | Sugar, percent |
|---|---|---|---|
| 2 | 1 | 11.35 | 40 |
| 1 | 1 | 12.65 | 33 |
| 1 | 2 | 14.15 | 25 |

[a] Weight ratio.
[b] Acetylated allyl methyl glucoside was used having a D.S. of 1.07 (with respect to allyl).

*Example II*

A further polymer in accordance with my invention was prepared by first dissolving 5 gms. of methyl mono-O-allyl-α-D-glucoside and 0.1 gm. of ammonium persulfate in 70 ml. of water. This solution was then heated to a temperature of about 70° C. I slowly added thereto over a period of 2 hrs. an aqueous solution prepared from 30 ml. of water and 5 gms. of acrylamide. The mixture was stirred and maintained at said temperature of 70° C. during the addition of the said acrylamide solution. Following the addition of the aforementioned acrylamide solution, the resulting mixture was maintained at the said temperature of 70° C. for 10 hours. During the said period of 10 hrs. I added approximately 50 ml. of water to keep the mixture relatively fluid. The highly thickened polymer solution resulting from the foregoing was poured slowly into methanol while stirring. The polymer in the said solution precipitated in the methanol. It was collected, washed with an additional quantity of methanol, and dried. The dry weight thereof was approximately 8 gms. The analysis of the polymer so produced indicated a carbohydrate content of about 40% by weight.

*Example III*

Mixtures of mono- and diallyl methyl glucosides (3 g. total) the ratios of which are given in the table which follows were placed in test tubes, the temperature adjusted to 115–120°, and a stream of oxygen was passed through them. Then a solution of 1.5 g. (in one sample somewhat more) of acrylamide in ethanol-water (7:3, v./v.) was added dropwise over a period of 30–60 min. As the solvent evaporated it was replaced by water. The mixture was stirred frequently. After 2–3 hr. it started to thicken considerably. Some more water was added in order to be able to maintain the stream of oxygen. The polymerization was discontinued after 4–5 hr., an aqueous solution of 0.1 g. of ammonium persulfate was added and the mixture was kept at 50° for 15 hr. The polymer then was precipitated and washed thoroughly with methanol and dried. The yield usually was 3.5 to 4.0 g. The table which follows gives the results obtained, including the viscosity ("vis.") of aqueous solutions of the copolymers obtained:

| Polymer Number | Percent [a] | | | N, percent | Sugar percent | Vis., cps. (3%) |
|---|---|---|---|---|---|---|
| | Mono- | Di- | Acryl- | | | |
| 1 | 66.7 | 0 | 33.3 | 7.65 | 60 | 5 |
| 2 | 63.4 | 3.3 | 33.3 | 9.55 | 50 | 10 |
| 3 | 62.3 | 4.4 | 33.3 | 9.35 | 51 | 104 |
| 4 | 51.9 | 5.3 | 42.8 | 8.65 | 55 | 920 |
| 5 | 60.0 | 6.7 | 33.3 | 7.90 | 58 | [b] 234 |
| 6 | 50.0 | 16.7 | 33.3 | 9.25 | 51 | Ins. |

[a] Percent by weight.
[b] Partially insoluble.

It will be noted from the above that the copolymer of only methyl mono-O-allyl-α-D-glucoside and acrylamide has a relatively low viscosity. If desired, the viscosity of such a material may be increased by adding a small amount of methyl di-O-allyl-α-D-glucoside to the initial monomer mixture prior to polymerization. Depending upon the amount of methyl di-O-allyl-α-D-glucoside added, the resulting polymer will range in water solubility from complete solubility to complete insolubility.

Aqueous solutions of some of my inventive copolymers exhibit a high viscoelasticity, resembling the behavior of psyllium seed or quince seed gums.

In accordance with a further embodiment of my invention, I may saponify my inventive copolymers to split off some or all of the amide groups, using a simple alkali such as sodium potassium or lithium hydroxide and thereby forming the corresponding alkali metal salts. This treatment has the effect of greatly increasing the viscosity of the aqueous solutions obtained from a given copolymer. Also, it greatly improves the solubility of those inventive copolymers having somewhat reduced solubility to begin with. Thus, for example, I dissolved or dispersed varying percentages of various of the inventive copolymers in water and heated them with an excess of sodium hydroxide based on the number of amide groups in the particular copolymer being treated. The sodium salt so produced was precipitated from the aqueous mixture thereof, washed with additional quantities of methanol until neutral to remove excess sodium hydroxide, and dried. Thus, for example, in keeping with the foregoing I prepared sodium salts of polymers Nos. 2, 3, 4 and 5 set forth in the table in column 3 hereof. I prepared aqueous solutions containing 3% by weight of the sodium salts so prepared. These salts had viscosities of 200, 4,000, 2,000, and 20,000, respectively. A comparison of these viscosities with the viscosities of the polymer from which the sodium salts were prepared as will be noted in column 3 hereof demonstrates the tremendous increase in viscosity of the sodium salt over the polymer, per se. As an additional example of my invention, I prepared a sodium salt of the polymer identified in footnote b in column 3 hereof. The resulting sodium salt in a 1½% aqueous solution had a viscosity of higher than 60,000 cps. although the polymer from which said sodium salt was prepared was water insoluble.

The products which are made in accordance with my invention are very useful: thus, films may be cast by dissolving them in a suitable solvent, such as water, aqueous methanol and the like and allowing the solvent to dry. These films are useful for cloth and the like, and may be used as a carrier for silver halides for light sensitive layers for photographic purposes.

While my invention has been described with the aid of specific examples, it will be apparent that many variations can be made in starting materials, proportions, reaction temperature, reaction times, after treatment of the products, and the like, all within the broad scope of the invention, as set forth in claims which follow.

I claim:
1. The copolymer of allyl methyl α-D-glucoside and acrylamide.
2. The copolymer in accordance with claim 1 wherein said glucoside has a D.S. of 1.0.
3. The copolymer in accordance with claim 1 wherein said glucoside has a D.S. of 2.0.
4. The copolymer in accordance with claim 1 wherein the ratio of said glucoside to said acrylamide is within the range of about 10:1 to 1:10.
5. The copolymer of methyl mono-O-allyl-α-D-glucoside, methyl di-O-allyl-α-D-glucoside, and acrylamide.
6. The copolymer in accordance with claim 1 wherein said glucoside has a D.S. of 1.0, and wherein the ratio of said glucoside to said acrylamide is within the range of about 10:1 to 1:10.
7. The copolymer in accordance with claim 1 wherein said glucoside has a D.S. of 2.0 and wherein the ratio of said glucoside to said acrylamide is within the range of about 10:1 to 1:10.
8. The product obtainable from the copolymer of claim 1 by saponification thereof with an alkali metal hydroxide.
9. The product obtainable from the copolymer of claim 2 by saponification thereof with an alkali metal hydroxide.
10. The product obtainable from the copolymer of claim 3 by saponification thereof with an alkali metal hydroxide.
11. The product obtainable from the copolymer of claim 4 by saponification thereof with an alkali metal hydroxide.
12. The product obtainable from the copolymer of claim 5 by saponification thereof with an alkali metal hydroxide.
13. The product obtainable from the copolymer of claim 6 by saponification thereof with an alkali metal hydroxide.
14. The product obtainable from the copolymer of claim 7 by saponification thereof within an alkali metal hydroxide.
15. The process of producing a polymer which com- prises reacting an allyl ether of methyl α-D-glucoside with acrylamide in the presence of a polymerization catalyst, said reaction being carried out at a sufficient temperature and for a sufficient period of time to allow copolymerization to take place.

16. The process of claim 15 in which the said ether has a D.S. of 1.0.

17. The process of claim 15 in which the said ether has a D.S. of 2.0.

18. The process of claim 15 in which a mixture of allyl ethers having a D.S. of 1 and a D.S. of 2 are employed.

19. The process of claim 15 in which said catalyst is a peroxide catalyst.

20. The process of claim 15 in which oxygen per se is used as a catalyst.

21. The process of producing a new and useful thickening agent for aqueous solutions which comprises reacting allyl ether of methyl α-D-glucoside and acrylamide in the presence of a polymerization catalyst therefor, and saponifying the polymer so produced with an alkali metal hydroxide.

22. The process in accordance with claim 21 in which said alkali metal is sodium.

23. The process of claim 15 wherein said polymerization catalyst is an oxidizing catalyst.

24. The process of claim 15 wherein said polymerization reaction is carried out at a temperature ranging from 45 to 70° C.

25. The process of claim 15 wherein said polymerization catalyst is an oxidizing catalyst.

26. The process of claim 15 wherein said allyl ether of methyl α-D-glucoside and acrylamide are reacted at a temperature ranging from 45 to 70° C.

No references cited.

SAMUEL H. BLECH, *Primary Examiner.*

WILLIAM H. SHORT, *Examiner.*

J. NORRIS, *Assistant Examiner.*